US008964733B1

(12) United States Patent
Aybay et al.

(10) Patent No.: US 8,964,733 B1
(45) Date of Patent: *Feb. 24, 2015

(54) CONTROL PLANE ARCHITECTURE FOR SWITCH FABRICS

(71) Applicant: Juniper Networks, Inc., Sunnyvale, CA (US)

(72) Inventors: Gunes Aybay, Los Altos, CA (US); Jean-Marc Frailong, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/445,834

(22) Filed: Jul. 29, 2014

Related U.S. Application Data

(63) Continuation of application No. 12/345,498, filed on Dec. 29, 2008, now Pat. No. 8,798,045.

(51) Int. Cl.
| | | |
|---|---|---|
| *H04L 12/50* | (2006.01) | |
| *H04L 12/24* | (2006.01) | |
| *H04L 12/933* | (2013.01) | |

(Continued)

(52) U.S. Cl.
CPC ............... *H04L 41/12* (2013.01); *H04L 49/10* (2013.01); *H04L 49/25* (2013.01); *H04Q 11/0005* (2013.01); *H04Q 11/0066* (2013.01); *H04Q 2011/009* (2013.01)
USPC ............................ 370/388; 370/386; 370/387

(58) Field of Classification Search
None
See application file for complete search history.

(56) References Cited

U.S. PATENT DOCUMENTS

| | | |
|---|---|---|
| 5,138,615 A | 8/1992 | Lamport et al. |
| 5,801,641 A | 9/1998 | Yang et al. |

(Continued)

FOREIGN PATENT DOCUMENTS

| | | |
|---|---|---|
| EP | 1 318 628 A1 | 6/2003 |
| EP | 1 758 320 A1 | 2/2007 |

(Continued)

OTHER PUBLICATIONS

Gunes Aybay et al., "Front-to-Back Cooling System for Modular Systems with Orthogonal Midplane Configuration" U.S. Appl. No. 12/167,604, filed Jul. 3, 2008, (25 pgs).

(Continued)

*Primary Examiner* — Faruk Hamza
*Assistant Examiner* — Aixa Guadalupe-Cruz
(74) *Attorney, Agent, or Firm* — Cooley LLP

(57) ABSTRACT

In some embodiments, a system includes multiple access switches, a switch fabric having multiple switch fabric portions, and a control plane processor. Each switch fabric portion is coupled to at least one access switch by a cable from a first set of cables. Each switch fabric portion is configured to receive data from the at least one access switch via the cable from the first set of cables. The control plane processor is coupled to each switch fabric portion by a cable from a second set of cables. The control plane processor is configured to send control information to each access switch via a cable from the second set of cables, a switch fabric portion, and a cable from the first set of cables. The control plane processor is configured to determine control plane connections associated with each access switch and is configured to determine data plane connections associated with each access switch as a result of the control plane connections.

20 Claims, 6 Drawing Sheets

(51) Int. Cl.
*H04L 12/947* (2013.01)
*H04Q 11/00* (2006.01)

(56) References Cited

U.S. PATENT DOCUMENTS

| | | |
|---|---|---|
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 6,075,773 A | 6/2000 | Clark et al. |
| 6,212,183 B1 | 4/2001 | Wilford |
| 6,246,692 B1 | 6/2001 | Dai et al. |
| 6,385,198 B1 | 5/2002 | Ofek et al. |
| 6,393,026 B1 | 5/2002 | Irwin |
| 6,553,028 B1 | 4/2003 | Tang et al. |
| 6,609,153 B1 | 8/2003 | Salkewicz |
| 6,639,910 B1 * | 10/2003 | Provencher et al. ......... 370/351 |
| 6,654,373 B1 | 11/2003 | Maher, III et al. |
| 6,658,481 B1 | 12/2003 | Basso et al. |
| 6,816,486 B1 | 11/2004 | Rogers |
| 6,823,454 B1 | 11/2004 | Hind et al. |
| 6,856,620 B1 | 2/2005 | Dunsmore et al. |
| 6,865,673 B1 | 3/2005 | Nessett et al. |
| 6,868,082 B1 | 3/2005 | Allen, Jr. et al. |
| 6,934,260 B1 | 8/2005 | Kanuri |
| 7,024,592 B1 | 4/2006 | Voas et al. |
| 7,173,931 B2 | 2/2007 | Chao et al. |
| 7,230,947 B1 | 6/2007 | Huber et al. |
| 7,233,568 B2 | 6/2007 | Goodman et al. |
| 7,245,629 B1 | 7/2007 | Yip et al. |
| 7,248,760 B1 | 7/2007 | Corbalis et al. |
| 7,277,429 B2 | 10/2007 | Norman et al. |
| 7,289,513 B1 | 10/2007 | Medved et al. |
| 7,315,897 B1 | 1/2008 | Hardee et al. |
| 7,330,467 B2 | 2/2008 | Sharma |
| 7,369,561 B2 | 5/2008 | Wybenga et al. |
| 7,406,038 B1 | 7/2008 | Oelke et al. |
| 7,408,927 B2 | 8/2008 | George |
| 7,415,034 B2 | 8/2008 | Muller et al. |
| 7,415,627 B1 | 8/2008 | Radhakrishnan et al. |
| 7,428,219 B2 | 9/2008 | Khosravi |
| 7,437,469 B2 | 10/2008 | Ellanti et al. |
| 7,466,703 B1 | 12/2008 | Arunachalam et al. |
| 7,471,676 B2 | 12/2008 | Wybenga et al. |
| 7,596,614 B2 | 9/2009 | Saunderson et al. |
| 7,664,123 B2 | 2/2010 | Ashwood Smith et al. |
| 7,675,912 B1 | 3/2010 | Ward et al. |
| 7,702,765 B1 | 4/2010 | Raszuk |
| 7,715,382 B2 | 5/2010 | Lakshman et al. |
| 7,746,799 B2 | 6/2010 | Kokot et al. |
| 7,792,993 B1 | 9/2010 | Hopprich et al. |
| 7,860,097 B1 | 12/2010 | Lovett et al. |
| 7,877,483 B1 | 1/2011 | Finn |
| 8,089,904 B2 | 1/2012 | Balasubramaniam et al. |
| 8,175,079 B2 | 5/2012 | Alapuranen et al. |
| 2002/0009078 A1 | 1/2002 | Wilson et al. |
| 2002/0051450 A1 | 5/2002 | Ganesh et al. |
| 2003/0039212 A1 | 2/2003 | Lloyd et al. |
| 2004/0023558 A1 | 2/2004 | Fowler |
| 2004/0034702 A1 | 2/2004 | He |
| 2004/0039820 A1 | 2/2004 | Colby et al. |
| 2004/0054866 A1 | 3/2004 | Blumenau et al. |
| 2004/0064559 A1 | 4/2004 | Kupst et al. |
| 2004/0076151 A1 | 4/2004 | Fant et al. |
| 2004/0254909 A1 | 12/2004 | Testa |
| 2005/0129017 A1 | 6/2005 | Guingo et al. |
| 2005/0138346 A1 | 6/2005 | Cauthron |
| 2005/0180438 A1 | 8/2005 | Ko et al. |
| 2005/0193114 A1 | 9/2005 | Colby et al. |
| 2005/0232258 A1 | 10/2005 | Wybenga et al. |
| 2005/0267959 A1 | 12/2005 | Monga et al. |
| 2006/0005185 A1 | 1/2006 | Nguyen |
| 2006/0092975 A1 | 5/2006 | Ansari et al. |
| 2006/0164199 A1 | 7/2006 | Gilde et al. |
| 2006/0165085 A1 | 7/2006 | Konda |
| 2006/0198321 A1 | 9/2006 | Nadeau et al. |
| 2007/0036178 A1 | 2/2007 | Hares et al. |
| 2007/0073882 A1 | 3/2007 | Brown et al. |
| 2007/0115918 A1 | 5/2007 | Bodin et al. |
| 2007/0136489 A1 | 6/2007 | Temoshenko et al. |
| 2007/0153462 A1 | 7/2007 | Crippen et al. |
| 2007/0283045 A1 | 12/2007 | Nguyen et al. |
| 2008/0031151 A1 | 2/2008 | Williams |
| 2008/0086768 A1 | 4/2008 | Mirza-Baig |
| 2008/0089323 A1 | 4/2008 | Elias et al. |
| 2008/0112133 A1 | 5/2008 | Torudbakken et al. |
| 2008/0126788 A1 | 5/2008 | Kreek et al. |
| 2008/0130517 A1 | 6/2008 | Lee et al. |
| 2008/0151863 A1 | 6/2008 | Lawrence et al. |
| 2008/0165704 A1 | 7/2008 | Marchetti et al. |
| 2008/0186875 A1 | 8/2008 | Kitani |
| 2008/0192648 A1 | 8/2008 | Galles |
| 2008/0214059 A1 | 9/2008 | Rothermel et al. |
| 2008/0219184 A1 | 9/2008 | Fowler et al. |
| 2008/0320117 A1 | 12/2008 | Johnsen et al. |
| 2009/0049191 A1 | 2/2009 | Tolliver |
| 2009/0109963 A1 | 4/2009 | Tanizawa et al. |
| 2009/0213779 A1 | 8/2009 | Zhang et al. |
| 2009/0219830 A1 | 9/2009 | Venner et al. |
| 2009/0271851 A1 | 10/2009 | Hoppe et al. |
| 2009/0304010 A1 | 12/2009 | Kurebayashi et al. |
| 2009/0328024 A1 | 12/2009 | Li et al. |
| 2010/0002382 A1 | 1/2010 | Aybay et al. |
| 2010/0002714 A1 | 1/2010 | George et al. |
| 2010/0091779 A1 | 4/2010 | Juhl et al. |
| 2010/0097926 A1 | 4/2010 | Huang et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0182933 A1 | 7/2010 | Hu et al. |
| 2010/0214949 A1 | 8/2010 | Smith et al. |
| 2010/0265832 A1 | 10/2010 | Bajpay et al. |
| 2010/0306408 A1 | 12/2010 | Greenberg et al. |
| 2011/0069706 A1 | 3/2011 | Sen et al. |
| 2011/0161468 A1 | 6/2011 | Tuckey et al. |
| 2012/0033665 A1 | 2/2012 | Da Silva et al. |
| 2012/0069842 A1 | 3/2012 | Reddy et al. |
| 2012/0093154 A1 | 4/2012 | Rosenberg et al. |
| 2012/0128004 A1 | 5/2012 | Aybay et al. |
| 2012/0155320 A1 | 6/2012 | Vohra et al. |
| 2012/0155453 A1 | 6/2012 | Vohra |
| 2012/0158930 A1 | 6/2012 | Kalusivalingam et al. |
| 2012/0158942 A1 | 6/2012 | Kalusivalingam et al. |
| 2012/0189009 A1 | 7/2012 | Shekhar et al. |

FOREIGN PATENT DOCUMENTS

| | | |
|---|---|---|
| EP | 1 892 905 A1 | 2/2008 |
| EP | 1 924 030 A1 | 5/2008 |
| EP | 2 164 209 A1 | 3/2010 |
| EP | 2 413 550 AI | 7/2011 |
| EP | 2 369 782 A1 | 9/2011 |
| EP | 2 456 138 A1 | 5/2012 |
| EP | 2 466 825 A1 | 6/2012 |
| EP | 2 466 826 A1 | 6/2012 |
| GB | 2 362 289 A | 11/2001 |
| WO | WO 00/08801 | 2/2000 |
| WO | WO 2008/144927 A1 | 12/2008 |

OTHER PUBLICATIONS

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

U.S. Appl. No. 12/415,504, filed Mar. 31, 2009, entitled "Methods and Apparatus for Dynamic Automated Configuration Within a Control Plane of a Switch Fabric" (53 pgs).

K. Kompella et al., "Virtual Private LAN Service (VPLS) Using BGP for Auto-Discovery and Signaling" [online], Retrieved from the

(56) References Cited

OTHER PUBLICATIONS

Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Office Action for U.S. Appl. No. 12/415,504, mailed Apr. 30, 2012.
Final Office Action for U.S. Appl. No. 12/415,504, mailed Oct. 10, 2012.
Office Action for U.S. Appl. No. 13/053,801, mailed Dec. 6, 2012.
Office Action for U.S. Appl. No. 12/969,233, mailed Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.
Office Action mailed Jul. 30, 2012 for U.S. Appl. No. 12/968,957, filed Dec. 10, 2010.
Office Action mailed Sep. 17, 2012 for U.S. Appl. No. 12/951,706, mailed Sep. 17, 2012.
Office Action mailed Mar. 14, 2013 for U.S. Appl. No. 13/197,212, filed Aug. 3, 2011.
U.S. Appl. No. 13/435,919, filed Mar. 30, 2012, entitled "Methods and Apparatus for Virtualizing Switch Control Plane Engine".
U.S. Appl. No. 13/342,277, filed Dec. 22, 2011, entitled "Methods and Apparatus for Using Border Gateway Protocol (BGP) for Converged Fibre Channel (FC) Control Plane".
U.S. Appl. No. 13/333,031, filed Dec. 21, 2011, entitled "Methods and Apparatus for a Distributed Fibre Channel Control Plane".
U.S. Appl. No. 13/333,039, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".
Office Action mailed Mar. 25, 2013 for U.S. Appl. No. 12/969,277, filed Dec. 15, 2010.
Extended Search Report for European Application No. 11158837.2, mailed Jun. 21, 2011.
Extended Search Report for European Application No. 11179603.3, mailed Dec. 21, 2011.
Extended Search Report for European Application No. 11192571.5, mailed Mar. 19, 2012.
Extended Search Report for European Application No. 11192565.7, mailed Mar. 30, 2012.
Extended Search Report for European Application No. 11174003.1, mailed Feb. 8, 2012.
Extended Search Report for European Application No. 11175433.9, mailed Oct. 7, 2011.

* cited by examiner

CONTROL PLANE ARCHITECTURE FOR SWITCH FABRICS

CROSS REFERENCE TO RELATED APPLICATION

This application is a continuation of U.S. patent application Ser. No. 12/345,498, filed Dec. 29, 2008 and titled "Control Plane Architecture for Switch Fabrics," now U.S. Pat. No. 8,798,045, which is incorporated herein by reference in its entirety.

BACKGROUND

Embodiments described herein relate generally to telecommunications switch fabrics and more particularly to control planes within switch fabrics.

Switch fabrics can be used, for example, to route data between multiple network devices and/or storage devices. Each network device and/or storage device can be operatively coupled to the switch fabric and can control data input to and output from the switch fabric. In this manner, each network device and/or storage device can send data to the switch fabric and receive data from the switch fabric.

Control processors can be used to monitor and/or control the operation of the switch fabric. For example, a control processor can be used to maintain and/or distribute a routing table to modules within the various stages of the switch fabric and/or the network devices and/or storage devices configured to interface with the switch fabric. Such a routing table can contain information indicating where each module within the switch fabric, the network devices and/or the storage devices should forward the data such that the data reaches its destination. For example, the routing table can indicate to which module within a second stage of a switch fabric a module within a first stage of the switch fabric should send a particular data packet to.

The control processor can be electrically and physically coupled to each module within the switch fabric and/or each access switch by multiple cables. If the switch fabric contains a large number of modules and/or if a large number of network devices and/or storage devices are configured to send data to the switch fabric, a large number of cables are typically used. This is in addition to the cables used to send data within the switch fabric. Thus, the number of cables used in the system can be relatively large and potentially unmanageable.

Additionally, if the control signals are sent via cables separate from the cables used to send the data signals, data signals can still be sent even if the control signal becomes inoperable. This can be undesirable because the data is sent without having anything controlling and/or monitoring to where the data is sent.

Thus, a need exists for a switch fabric system having a relatively few number of physical connections between a control processor and the modules within the switch fabric and/or the access switches. Additionally, a switch fabric system where data will not be sent if the control connections become inoperable, would be advantageous.

SUMMARY

In some embodiments, a system includes multiple access switches, a switch fabric having multiple switch fabric portions, and a control plane processor. Each switch fabric portion is coupled to at least one access switch by a cable from a first set of cables. Each switch fabric portion is configured to receive data from the at least one access switch via the cable from the first set of cables. The control plane processor is coupled to each switch fabric portion by a cable from a second set of cables. The control plane processor is configured to send control information to each access switch via a cable from the second set of cables, a switch fabric portion, and a cable from the first set of cables. The control plane processor is configured to determine control plane connections associated with each access switch and is configured to determine data plane connections associated with each access switch as a result of the control plane connections.

DETAILED DESCRIPTION

Figure 1:
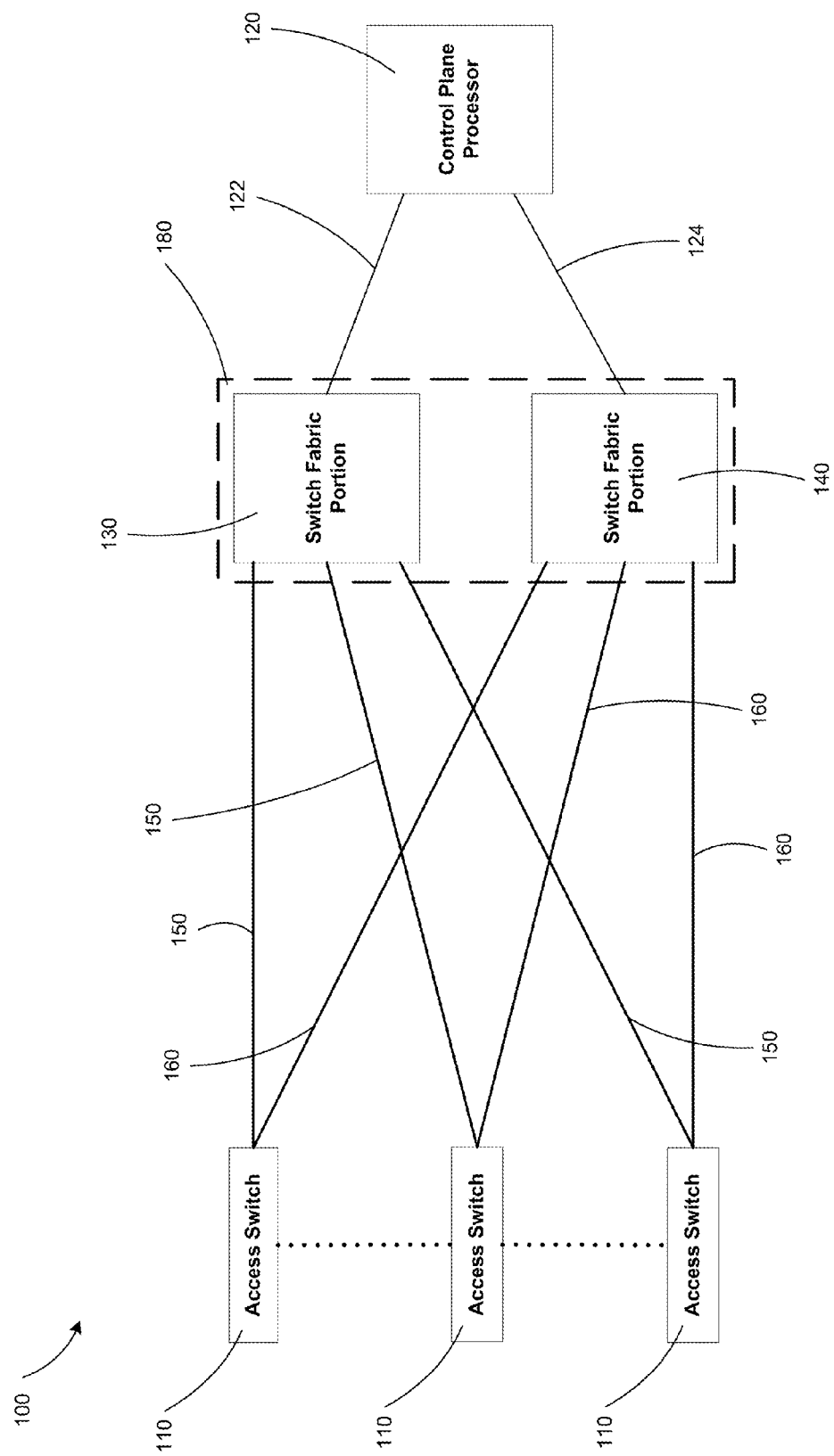
FIG. 1 is a schematic illustration of a switch fabric system, according to an embodiment.

In some embodiments, a system includes multiple access switches, a switch fabric having multiple switch fabric portions, and a control plane processor. Each switch fabric portion is coupled to at least one access switch by a cable from a first set of cables. Each switch fabric portion is configured to receive data from the at least one access switch via the cable from the first set of cables. The control plane processor is coupled to each switch fabric portion by a cable from a second set of cables. The control plane processor is configured to send control information to each access switch via a cable from the second set of cables, a switch fabric portion, and a cable from the first set of cables. Because each cable from the first set of cables can carry both data signals and control signals (i.e., each cable from the first set of cables includes a portion of the data plane of the system and a portion of the control plane of the system, as described in further detail below), if a cable from the first set of cables is inoperable, both control signals and data signals are prevented from being sent via the cable from the first set of cables. Thus, data cannot be sent without a control signal controlling the data.

As used herein, the term "control plane" refers to portions of the components, modules, cables, processors, and/or switches of a switch fabric system through which control signals are transmitted, defined, received, and/or the like. Said another way, the control plane of a switch fabric system is a portion of the switch fabric system that controls the operation of the switch fabric system. Control signals can include any signal configured to control and/or monitor the operation of the switch fabric system. For example, control signals can control and/or monitor the routing of data signals through the switch fabric. A control signal can include, for example, handshaking signals, packet-forwarding information, routing protocols, bridging protocols, error recovery information, routing tables, switch tables, topology-discovery signals, and/or the like.

As used herein, the term "data plane" refers to the portions of the components, modules, cables, processors, and/or switches of a switch fabric system through which data signals are transmitted, defined, received, and/or the like. Data signals can include any signal that contains data to be sent between a first network device and/or storage device operatively coupled to the switch fabric system and a second network device and/or storage device operatively coupled to the switch fabric system. Data signals are different than control signals in that data signals are the signals to be transmitted through the switch fabric system and are not used to control and/or monitor the switch fabric system. In some embodiments, for example, a data signal can include a data packet and/or a portion of a data packet such as a cell. If a portion of a component, module, cable, processor, and/or switch transmits, defines, and/or receives both control signals and data signals, that portion of the component, module, cable, processor, and/or switch is part of the control plane of a switch fabric system with respect to the control functionality and part of the data plane of the switch fabric system with respect to the data functionality.

In some embodiments, a signal, packet, and/or cell includes both a data portion and a control portion. In such embodiments, the portions of a switch fabric system that transmit, define, and/or receive the data portions of the signal are part of the data plane of the switch fabric system. Similarly, the portions of the switch fabric system that transmit, define, and/or receive the control portions of the signal are part of the control plane of the switch fabric system.

As used herein, a data packet refers to any portion of a data message that is to be sent between two nodes within a switch fabric system. When a data packet is sent through a data plane of a switch fabric system, the data packet may be split into multiple smaller data cells and reassembled at various stages of the switch fabric system.

In some embodiments, the control plane processor is configured to determine control plane connections associated with each access switch. Because each cable from the first set of cables includes a portion of the data plane and a portion of the control plane of the system, the control plane processor is configured to determine data plane connections associated with each access switch as a result of the control plane connections, as described in further detail herein.

In some embodiments, a system includes a first switch fabric portion, a second switch fabric portion, a first group of access switches, a second group of access switches, a first control plane processor and a second control plane processor. Each access switch from the first group of access switches is uniquely coupled to the first switch fabric portion via a cable from a first set of cables. Each access switch from the second group of access switches is uniquely coupled to the second switch fabric portion via a cable from a second set of cables. The first control plane processor is operatively coupled to the first switch fabric portion and the second switch fabric portion, and is configured to send control information to a first set of access switches. The first set of access switches includes access switches from the first group of access switches and the second group of access switches.

The second control plane processor is operatively coupled to the first switch fabric portion and the second switch fabric portion, and is configured to send control information to a second set of access switches. The second set of access switches includes access switches from the first group of access switches and the second group of access switches. In some embodiments, the first set of access switches is mutually exclusive from the second set of access switches. Said another way, the first control plane processor sends control information to the access switches that the second control plane processor does not send control information to, and vice versa. In other embodiments, each access switch within the first set of access switches is also within the second set of access switches, and vice versa. In such embodiments, the first control plane processor sends a first type of control information to the access switches and the second control plane processor sends a second type of control information to the access switches.

FIG. 1 is a schematic illustration of a switch fabric system 100, according to an embodiment. Switch fabric system 100 includes access switches 110, first cables 150, second cables 160, a third cable 122, a fourth cable 124, a switch fabric 180, and a control plane processor 120. The switch fabric 180 includes a first switch fabric portion 130 and a second switch fabric portion 140. The switch fabric portions 130, 140 are configured to allow a first access switch 110 to send data to a second access switch 110. In some embodiments, for example, each switch fabric portion 130, 140 can include a number of switch modules configured to route data between two separate access switches.

In some embodiments, each switch module is a cell switch. The cell switches are configured to redirect cells (e.g., portions of data packets) as they flow through the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell per time period and all output ports to read one outgoing cell per time period. In other embodiments, all input ports write one cell indicator (e.g., a pointer to a cell stored in a separate memory portion) per time period and all output ports read one cell indicator per time period. Each cell switch operates similar to a crossbar switch that can be reconfigured in each subsequent time period.

In alternate embodiments, each switch module is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

In some embodiments, the switch fabric 180 can be similar to the switch fabrics shown and described in U.S. patent application Ser. No. 12/345,500, filed Dec. 29, 2008, entitled "System Architecture for a Scalable and Distributed Multi-Stage Switch Fabric," and U.S. patent application Ser. No. 12/345,502, filed Dec. 29, 2008, entitled "Methods and Apparatus related to a Modular Switch Architecture," both of which are incorporated herein by reference in their entireties. In some embodiments, for example, the switch fabric 180 can be a rearrangeably non-blocking Clos network such as a Benes network. In other embodiments, the switch fabric can be a strictly non-blocking Clos network. In still other embodiments, the switch fabric can be any switch fabric configured to route data from a first access switch to a second access switch.

The switch fabric portions 130, 140 can have any number of stages and/or switches to route data from a first access switch to a second access switch. In some embodiments, for example, each switch fabric portion 130, 140 has three stages including multiple switch modules in each stage. In other embodiments, each switch fabric portion has five stages including multiple switch modules in each stage.

In some embodiments, each switch fabric portion 130, 140 of the switch fabric 180 can operate as a stand-alone switch fabric. Having two switch fabric portions 130, 140 that can operate as stand-alone switch fabrics allows the first switch fabric portion 130 to operate as a primary switch fabric and the second switch fabric portion 140 to be used for redundancy. Thus, if the first switch fabric portion 130 fails to operate, data will not be lost because the second switch fabric portion 140 will continue to operate. In other embodiments, the second switch fabric portion is used to increase the number of possible data paths between two access switches. This can decrease the congestion within the switch fabric portions. In such embodiments, the switch fabric portions operate together to form a larger switch fabric.

The access switches 110 are configured to send data to and receive data from the switch fabric 180 (including the first switch fabric portion 130 and the second switch fabric portion 140). Each access switch 110 can include a processor, a memory buffer, switch modules and/or any other element to assist to send data to and receive data from the switch fabric 180.

In some embodiments, the access switches 110 are configured to perform operations on a data packet before it is sent to the switch fabric 180. In some embodiments, for example, data packet parsing, data packet classification, and/or data packet forwarding occur at the access switches 110. In some embodiments, data buffering and switch fabric flow control also occur at the access switches 110. In such embodiments, the access switches 110 prepare the data packet to enter the switch fabric 180.

Each access switch 110 of the switch fabric system 100 is physically located with and/or within a chassis. The chassis can be similar to the chassis 250 illustrated in FIG. 2. Chassis 250 includes an access switch 255 and multiple servers 260. Each server 260 is electrically coupled to the access switch 255 via a backplane connection (not shown). Each server 260 is configured to send data to and receive data from the access switch 255. In other embodiments, each server can be electrically coupled to the access switch in any manner. For example, in some embodiments, a midplane, multiple cables, a wireless connection and/or the like can be used to couple the servers 260 to the access switch 255. In other embodiments, various types of devices can be electrically coupled to the access switch. For example, storage devices, servers, workstations, and/or the like can be electrically coupled to the access switch. While chassis 250 is shown being associated with a single access switch 255, in other embodiments, the chassis can contain multiple access switches.

In still other embodiments, the access switch can be in a different chassis than the servers. In some embodiments, for example, the access switch can be a one rack unit (1U) device within a first chassis. Each server can be a 1U, 2U, 4U, and/or any size server within a second chassis. In other embodiments, each server can be a blade server. The servers within the second chassis can be operatively coupled to the access switch within the first chassis by multiple cables. In some embodiments, for example, the cables operatively coupling the servers with the access switch can be 10 Gigabit Ethernet lines implemented using twin-ax copper cables and/or optical transceivers with a fiber pair for each cable. In other embodiments, the cables can be 1 Gigabit Ethernet lines. In still other embodiments, the cables can be any Ethernet line or any other communication connection according to a suitable protocol.

Returning to FIG. 1, each access switch 110 is coupled to the first switch fabric portion 130 of the switch fabric 180 by a first cable 150. In such an embodiment, the first switch fabric portion 130 is physically located within a different chassis than the access switch 110. Each first cable 150 can be any cable configured to carry a signal. In some embodiments, for example, the first cables 150 can be 10 Gigabit Ethernet lines. In other embodiments, the first cables can be 1 Gigabit Ethernet lines. In still other embodiments, the first cables can be any Ethernet line or any other communication connection according to a suitable protocol. In alternate embodiments, the first switch fabric portion is physically located within the same chassis as an access switch. In such embodiments, a backplane connection, a midplane, and/or the like can be used to couple the access switch to the first switch fabric portion.

In some embodiments, each first cable 150 includes multiple strands. The strands of the first cable 150 can be constructed of any material configured to carry a signal. In some embodiments, for example, the strands are optical fibers configured to carry an optical signal. In other embodiments, the strands are electrical conductors, such as copper, configured to carry an electrical signal.

Each access switch 110 is configured to send signals to and/or receive signals from the first switch fabric portion 130 via the first cables 150. For example, the first cable 150 can be configured to carry data signals and/or control signals between the access switch 110 and the first switch fabric portion 130. Data signals can include data packets configured to be sent from a first access switch to a second access switch via the switch fabric 180. Control signals can include any signal configured to control and/or monitor the switch fabric system 100. In some embodiments, for example, a control signal can include handshaking signals, packet-forwarding information, routing protocols, bridging protocols, error recovery information, routing tables, switch tables, topology-discovery signals, and/or the like.

In some embodiments, for example, each first cable 150 includes twelve strands. In such embodiments, the switch fabric system 100 can use eleven of the twelve strands of each first cable 150 to send data signals between an access switch 110 and the first switch fabric portion 130. Such strands can be referred to as part of the data plane of the switch fabric system 100. The remaining strand of each first cable 150 can be used to send control signals between the access switch 110 and the first switch fabric portion 130. Such a strand can be referred to as part of the control plane of the switch fabric system 100. In other embodiments, each first cable can include any number of strands. In yet other embodiments, each first cable can dedicate any number of strands to the data plane and/or the control plane of the system. In still other embodiments, the control signals and the data signals can be carried by the same strand. For example, the control signals can be multiplexed with the data signals, for example, time multiplexed so that the control signals can be sent and received at times when the data signals are not being sent and received.

When a first cable 150 is connected between an access switch 110 and the first switch fabric portion 130, both the control plane connection between that access switch 110 and the first switch fabric portion 130 and the data plane connection between that access switch 110 and the first switch fabric portion 130 are connected. Similarly, when the first cable 150 is not connected between an access switch 110 and the first switch fabric portion 130, both the control plane connection between that access switch 110 and the first switch fabric portion 130 and the data plane connection between that access switch 110 and the first switch fabric portion 130 are not connected. Thus, when the data plane connection is connected, so is the control plane connection, and vice versa. Thus, the control plane connection is available for use in controlling data flow when the data plane connection is connected.

Each access switch 110 is coupled to the second switch fabric portion 140 of the switch fabric 180 by a second cable 160. Each second cable 160 can be any cable configured to carry a signal. In some embodiments, for example, the second cables 160 are structurally similar to the first cables 150.

In some embodiments, the second switch fabric portion 140 is within a chassis different than the chassis for the first switch fabric portion 130 and the chassis for the access switches 110. In other embodiments, the access switches, the first switch fabric portion, and/or the second switch fabric portion are physically located within a single chassis. In such embodiments, a backplane connector, a midplane, and/or the like can be used to couple the access switches to the second switch fabric portion.

Each access switch 110 is configured to send signals to and receive signals from the second switch fabric portion 140 via the second cables 160. For example, the second cable 160 can be configured to carry data signals and/or control signals between the access switches 110 and the second switch fabric portion 140. In some embodiments, for example, each second cable 160 includes twelve strands. In such an embodiment, the switch fabric system 100 can use eleven of the twelve strands of each second cable 160 to send data signals between an access switch 110 and the second switch fabric portion 140. Such strands can be referred to as part of the data plane of the switch fabric system 100. The remaining strand of each second cable 160 can be used to send control signals between the access switch 110 and the second switch fabric portion 140. Such a strand can be referred to as part of the control plane of the switch fabric system 100. In other embodiments, each second cable can include any number of strands. In yet other embodiments, each second cable can dedicate any number of strands to the data plane and/or the control plane of the system. In still other embodiments, the control signals and the data signals can be carried by the same strand. For example, the control signals can be multiplexed with the data signals, for example, time multiplexed so that the control signals can be sent and received at times when the data signals are not being sent and received.

When a second cable 160 is connected between an access switch 110 and the second switch fabric portion 140, both the control plane connection between that access switch 110 and the second switch fabric portion 140 and the data plane connection between that access switch 110 and the second switch fabric portion 140 are connected. Similarly, when a second cable 160 is not connected between an access switch 110 and the second switch fabric portion 140, both the control plane connection between that access switch 110 and the second switch fabric portion 140 and the data plane connection between that access switch 110 and the second switch fabric portion 140 are not connected. Thus, when the data plane connection is connected, so is the control plane connection, and vice versa. Thus, the control plane connection is available for use in controlling data flow when the data plane connection is connected.

Having control plane strands and data plane strands in a single cable reduces the amount of cabling. Instead of using two separate cables (a cable for the data plane connections and a cable for the control plane connections), a single cable can be used for both the control plane connection and the data plane connection. Further, having a single cable with both a control plane connection and a data plane connection, allows the switch fabric system 100 to determine a data plane topology (e.g., the various connections within the data plane) based on a control plane topology (e.g., the various connections within the control plane). Said another way, when the switch fabric system 100 determines a control plane topology, because the data plane connections run parallel to the control plane connections (e.g., in the same cables), the switch fabric system 100 also determines a data plane topology. Said yet another way, because the control plane connections are connected to the same access switches as the data plane connections, once control plane connections are identified, data plane connections are also known. In other embodiments, a control plane topology can be determined from a data plane topology, in a similar manner.

The first switch fabric portion 130 is electrically and physically coupled to the control plane processor 120 by the third cable 122. Similarly, the second switch fabric portion 140 is electrically and physically coupled to the control plane processor 120 by the fourth cable 124. The fourth cable 124 is structurally and functionally similar to the third cable 122 and is therefore, not described in detail herein.

The third cable 122 can be any cable configured to carry a signal. In some embodiments, for example, the third cable 122 can be a 10 Gigabit Ethernet line. In other embodiments, the third cable 122 can be a 1 Gigabit Ethernet line. In still other embodiments, the third cable 122 can be any Ethernet line configured to carry a signal or any other communication connection according to a suitable protocol.

In some embodiments, the third cable 122 includes multiple strands. The strands of the third cable 122 can be constructed of any material configured to carry a signal. In some embodiments, for example, the strands are optical fibers configured to carry an optical signal. In other embodiments, the strands are electrical conductors, such as copper, configured to carry an electrical signal. In other embodiments, the third cable can include a single strand configured to carry a signal.

The third cable 122 is configured to carry control signals between the first switch fabric portion 130 and the control plane processor 120. In other embodiments, the third cable can be configured to carry both data signals and control signals between the first switch fabric portion and the control plane processor. As discussed above, control signals can include any signal configured to control and/or monitor the switch fabric system 100. In some embodiments, for example, a control signal can include handshaking signals, packet-forwarding information, routing protocols, bridging protocols, error recovery information, routing tables, switch tables, topology-discovery signals, and/or the like.

The control plane processor 120 can be any processor configured to control the operation of a switch fabric system. In some embodiments, for example, the control plane processor 120 can include a processor configured to control the operation of the switch fabric system and/or a memory configured to store information necessary to control the operation of the switch fabric system 100. In some embodiments, for example, the control plane processor can be a generic high performance server. While switch fabric system 100 is shown as having a single control plane processor 120, any number of control plane processors can be used to control a switch fabric system, as described in further detail herein.

In some embodiments, the control plane processor 120 is physically located within a chassis different from the chassis for the first switch fabric portion 130, the chassis for the second switch fabric portion 140, and the chassis for the access switches 110. In other embodiments, the control plane processor, the access switches, the first switch fabric portion, and/or the second switch fabric portion are within a single chassis. In such an embodiment, a backplane connector, a midplane, and/or the like can be used to couple the control plane processor to the first switch fabric portion, the access switches, and/or the second switch fabric portion.

The control plane processor 120 can store any control data and/or execute any control protocol configured to monitor and/or control the operation of the switch fabric system 100. In some embodiments, for example, the control plane processor 120 can run topology-discovery protocols to discover a control plane topology and/or a data plane topology of the switch fabric system 100. In some embodiments, the control plane processor can determine and/or distribute packet-forwarding information such as a routing table, a mapping of the system, a switch table, and/or the like. Such packet-forwarding information can then be distributed to the various modules within the switch fabric 180 and/or the access switches 110. In other embodiments, the control plane processor can control error recovery of the system. In some embodiments, error recovery can recognize when a data connection is inoperable and/or a data packet has not been correctly forwarded through the system.

In use, the control plane processor 120 can run a control-plane-discovery protocol to determine the configuration of the control plane of the switch fabric system 100. Because the data plane topology is parallel to the control plane topology, the control plane processor 120 determines the configuration of the data plane of the switch fabric system 100 from the control-plane-discovery protocol.

Once the control plane processor 120 has determined the configuration (or topology) of the data plane and/or the control plane, a routing table can be defined. The routing table can include information relating to the routes a data packet takes as it traverses the switch fabric. For example, the routing table can indicate to which module within a second stage of a switch fabric a particular data packet should be sent from a module within a first stage of the switch fabric. In this manner, the routing table can be used to define, at least in part, the path or route of the data packet through the switch fabric to its destination access switch.

Once a routing table has been defined, a copy of the routing table is sent via the third cable 122 and the fourth cable 124 to the first switch fabric portion 130 and the second switch fabric portion 140, respectively. Each switch fabric portion 130, 140 can store a copy of the routing table such that when data is sent through either of the switch fabric portions 130, 140, the switch fabric portions 130, 140 will appropriately forward the message to its destination access switch. In other embodiments, a copy of the routing table is also sent to the access switches.

In addition to executing discovery protocols, defining routing tables and distributing routing tables, as stated above, the control plane processor 120 can perform any function appropriate for the operation of the switch fabric system 100. In some embodiments, for example, the control plane processor 120 can handle errors arising in the operation of the switch fabric system 100. For example, if a device (e.g., an access switch) within the switch fabric system 100 is disconnected, the control plane processor 120 can define a new routing table reflecting the new topology of the system (i.e., without the device) and send a copy of the new routing table to the other components of the switch fabric system 100.

Figure 3:
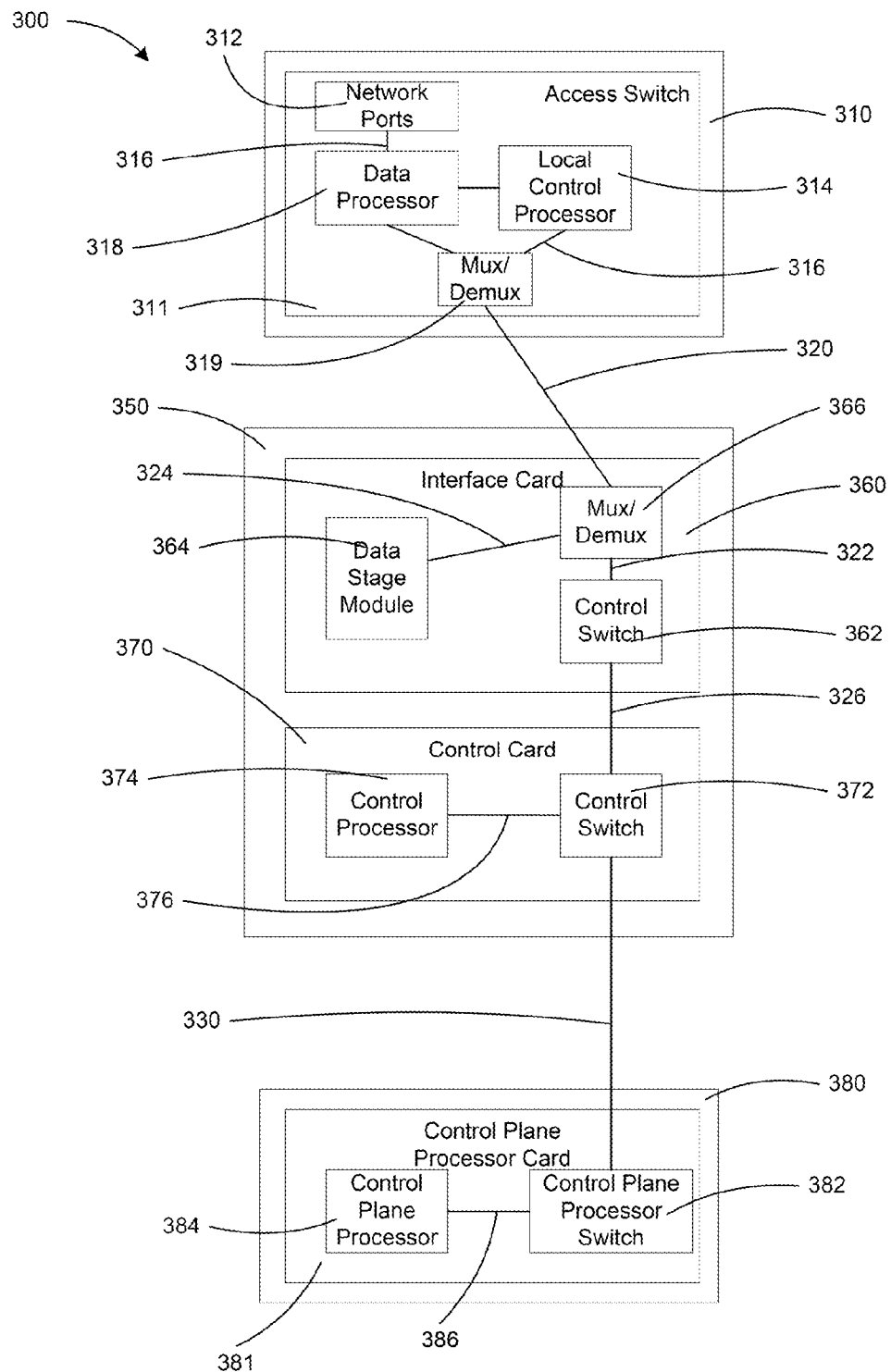
FIG. 3 is a schematic illustration of a portion of a control plane of a switch fabric system, according to another embodiment.

FIG. 3 is a schematic illustration of a portion of a control plane 300 of a switch fabric system, according to another embodiment. In some embodiments, the switch fabric system can be similar to the switch fabric system 100 shown and described above. The portion of the control plane 300 of the switch fabric system includes a first chassis 310, a second chassis 350, a third chassis 380, a first cable 320, and a second cable 330. An access switch 311 similar to the access switches 110 described above, is disposed within the first chassis 310. An interface card 360 that is part of a switch fabric portion, such as the switch fabric portions 130, 140 described above and a control card 370 are disposed within the second chassis 350. A control plane processor card 381 that includes a control plane processor 384 which is substantially similar to the control plane processor 120 described above, is disposed within the third chassis 380. The components disposed within the first chassis 310, the second chassis 350 and the third chassis 380 are described in further detail below.

The first cable 320 operatively couples the first chassis 310 with the second chassis 350. The first cable 320 of the control plane 300 can be any cable capable of operatively coupling the first chassis 310 with the second chassis 350. In some embodiments, for example, the first cable 320 can be a 10 Gigabit Ethernet line. In other embodiments, the first cable 320 can be a 1 Gigabit Ethernet line. In still other embodiments, the first cable 320 can be any Ethernet line configured to carry a signal or any other communication connection according to a suitable protocol.

In some embodiments, the first cable 320 includes multiple strands. The strands of the first cable 320 can be constructed of any material configured to carry a signal. In some embodiments, for example, the strands are optical fibers configured to carry an optical signal. In other embodiments, the strands are electrical conductors, such as copper, configured to carry an electrical signal. In some embodiments, the first cable 320 can include a single strand configured to carry a signal.

The first cable 320 is configured to carry both data signals and control signals between an access switch 311 within the first chassis 310 and an interface card 360 within the second chassis 350. In some embodiments, for example, the first cable 320 includes eleven strands configured to carry data signals and one strand configured to carry control signals. In other embodiments, the first cable includes any number of strands configured to carry data signals and/or control signals.

The second cable 330 operatively couples the second chassis 350 with the third chassis 380. The second cable 330 of the control plane 300 can be any cable capable of operatively coupling the second chassis 350 with the third chassis 380. In some embodiments, for example, the second cable 330 can be a 10 Gigabit Ethernet line. In other embodiments, the second cable 330 can be a 1 Gigabit Ethernet line. In still other embodiments, the second cable 330 can be any Ethernet line configured to carry a signal or any other communication connection according to a suitable protocol.

In some embodiments, the second cable 330 includes multiple strands. The strands of the second cable 330 can be constructed of any material configured to carry a signal. In some embodiments, for example, the strands are optical fibers configured to carry an optical signal. In other embodiments, the strands are electrical conductors, such as copper, configured to carry an electrical signal. In some embodiments, the second cable can include a single strand. The second cable 330 is configured to carry control signals between a control card 370 within the second chassis 350 and a control plane processor card 381 within the third chassis 380.

The first chassis 310 can be structurally and functionally similar to the chassis 250 shown and described above. An access switch 311 having network ports 312, a local control processor 314, a data processor 318, a multiplexer/demultiplexer 319 and multiple connections 316, is disposed within the first chassis 310. The network ports 312 are operatively coupled to the data processor 318 by a connection from the multiple connections 316. Similarly, the local control processor 314 and the data processor 318 are operatively coupled to each other and to the multiplexer/demultiplexer 319 by connections from the multiple connections 316. Each connection 316 can be any connection configured carry signals between the various components of the access switch 311. In some embodiments, for example, the connections 316 are electrical traces on a printed circuit board (PCB). In other embodiments, the connections can be electrical cables, optical fibers and/or the like.

Each network port 312 can be any port configured to transfer data between a cable and an on-chip device, such as, for example, between various servers and the data processor 318. In some embodiments, for example, each network port 312 can be a 10 Gigabit Ethernet port configured to receive 10 Gigabit Ethernet cables. In other embodiments, each network port can be a 1 Gigabit Ethernet port configured to receive 1 Gigabit Ethernet cables. In still other embodiments, each network port can be any Ethernet port configured to receive an Ethernet cable and/or any other communication port according to a suitable protocol. Each access switch 311 can contain any number of network ports 312 corresponding to the number of devices to be coupled to the access switch 311.

Figure 2:
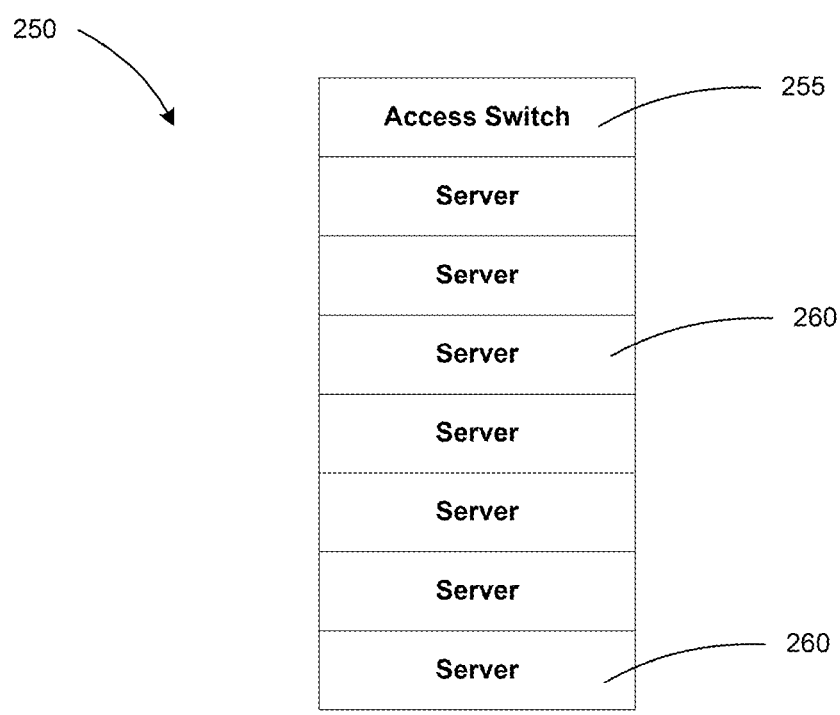
FIG. 2 is a schematic illustration of a chassis, according to another embodiment.

Multiple devices (not shown in FIG. 3), such as those shown and described with respect to FIG. 2 (for example, multiple servers), can be operatively coupled to the network ports 312. The network ports 312 are also operatively coupled to a switch fabric (a portion of which is shown with respect to interface card 360) via the processors 314, 318, the multiplexer/demultiplexer 319 and the first cable 320. The network ports 312 are configured to operatively couple a device (such as a server) from the multiple devices to the switch fabric such that the server can send signals to and/or receive signals from the switch fabric.

The local control processor 314 can be any processor configured to control and/or monitor the operation of the data processor 318 and/or the multiplexer/demultiplexer 319. In some embodiments, for example, the local control processor 314 is configured to send control signals to the data processor 318 and/or the multiplexer/demultiplexer 319 and/or receive status signals from the data processor 318 and/or the multiplexer/demultiplexer 319. In such embodiments, the local control processor 314 can manage and/or control the data processor 318 and/or be a local agent for the control plane processor 384, described in detail herein. The control signals can be configured to control which device is coupled to the switch fabric, the order in which signals should be sent to the switch fabric, and/or the like.

The local control processor 314 is operatively coupled to the switch fabric via a connection from the multiple connections 316, the multiplexer/demultiplexer 319 and the first cable 320. In this manner, the local control processor 314 can send control signals to and/or receive control signals from the other portions of the switch fabric system (including the control plane processor 384, described in further detail herein).

The data processor 318 is part of the data plane of the switch fabric system and performs certain operations on a data packet before it is sent to the switch fabric. If the data processor 318 receives a data packet from a network port 312, it prepares the data packet to enter the switch fabric and then sends portions of the data packet (e.g., in the form of one or more data cells) to the switch fabric via the multiplexer/demultiplexer 319 and the first cable 320. In some embodiments, for example, the data processor 318 controls data parsing, data classification, data forwarding, data buffering, and/or switch fabric flow control. If the data processor 318 receives a control signal from a network port 312, it forwards the control signal to the local control processor 314 for processing. Similarly, if the local control processor 314 sends a control signal to the data processor 318, the data processor 316 sends the control signal to a network device via a network port 312 and a cable (not shown) coupled to the network port 312.

The multiplexer/demultiplexer 319 is configured to ensure that the data signals and the control signals received from the data processor 318 and the local control processor 314, respectively, are correctly sent to the interface card 360 via the first cable 320. Additionally, the multiplexer/demultiplexer 319 is configured to ensure that the data signals and the control signals received from the interface card 360 are appropriately sent to the data processor 318 or the local control processor 314. The multiplexer/demultiplexer 319 can be any module configured to separate and/or combine the data signals and the control signals. In some embodiments, for example, the multiplexer/demultiplexer couples strands of the first cable 320 associated with the control plane with the connection 316 between the multiplexer/demultiplexer 319 and the data processor 318, and strands of the first cable 320 associated with the data plane with the connection 316 between the multiplexer/demultiplexer 319 and the local control processor 314. In other embodiments, the multiplexer/demultiplexer can have a multiplexing system configured to differentiate control signals and data signals received within a strand and forward the signals appropriately. After separating data signals and control signals received from the interface card 360, the multiplexer/demultiplexer 319 sends the data signals to the data processor 318 and the control signals to the local control processor 314. Similarly, after combining the data signals and control signals received from the data processor 318 and the local control processor 314, respectively, the multiplexer/demultiplexer 319 sends the signals to the interface card 360 via the first cable 320.

In other embodiments, the access switch does not include a multiplexer/demultiplexer. In such embodiments, each strand of the first cable is a dedicated data strand (only data signals are carried on that strand) or a dedicated control strand (only control signals are carried on that strand). In some embodiments, for example, each cable has 24 strands where 22 are dedicated data strands and 2 are dedicated control strands. Each dedicated data strand is operatively coupled to the data processor, and each dedicated control strand is operatively coupled to the local control processor. In such embodiments, if each first cable has 22 dedicated data strands, the data processor can receive 22 connections from the first cable. Similarly, if each first cable has 2 control strands, each local control processor can receive 2 connections from the first cable. In this manner, a multiplexer/demultiplexer is not needed as each strand of the first cable is operatively coupled to the processors. In embodiments where the first cable is an optical cable, a multi-channel parallel optical transceiver can be used at each end of the first cable to send and receive the optical signals.

In some embodiments, the multiplexer/demultiplexer 319 is operatively coupled to multiple switch fabric portions. In such embodiments, the multiplexer/demultiplexer 319 can be configured to send data and/or control signals from the same server to each of the switch fabric portions and/or send data and/or control signals from a different server to each of the switch fabric portions.

An interface card 360, a control card 370 and a connection 326 are disposed within the second chassis 350. The connection 326 operatively couples the interface card 360 with the control card 370. The connection 326 can be constructed of any material capable of operatively coupling the interface card 360 with the control card 370. In some embodiments, for example, the connection 326 is an electrical trace on a printed circuit board (PCB). In other embodiments, the connection can be an optical fiber, a copper wire and/or the like. The connection 326 is configured to carry control signals between a control switch 362 of the interface card 360 and a control switch 372 of the control card 370, as further described below.

The interface card 360 includes a multiplexer/demultiplexer 366, a data stage module 364, a control switch 362, a first connection 322 and a second connection 324. The first connection 322 operatively couples the multiplexer/demultiplexer 366 of the interface card 360 with the control switch 362 of the interface card 360. The first connection 322 can be constructed of any material capable of operatively coupling the multiplexer/demultiplexer 366 with the control switch 362. In some embodiments, for example, the first connection 322 is an electrical trace on a printed circuit board (PCB). In other embodiments, the first connection can be an optical fiber, a copper wire and/or the like. The first connection 322 is configured to carry control signals between the multiplexer/demultiplexer 366 of the interface card 360 and the control switch 362 of the interface card 360.

The second connection 324 operatively couples the multiplexer/demultiplexer 366 of the interface card 360 with the data stage module 364 of the interface card 360. The second connection 324 can be constructed of any material capable of operatively coupling the multiplexer/demultiplexer 366 with the data stage module 364. Similar to the first connection 322, in some embodiments, the second connection 322 is an electrical trace on a printed circuit board (PCB). In other embodiments, the second connection can be an optical fiber, a copper wire and/or the like. The second connection 324 is configured to carry data signals between the multiplexer/demultiplexer 366 of the interface card 360 and the data stage module 364 of the interface card 360.

The multiplexer/demultiplexer 366 is configured to separate the data signals and the control signals as these signals are received from the access switch 311 via the first cable 320 and/or combine data signals and control signals to be sent to the access switch 311 via the first cable 320. The multiplexer/demultiplexer 366 can be any module configured to separate and/or combine the data signals and the control signals. In some embodiments, for example, the multiplexer/demultiplexer couples strands of the first cable 320 associated with the control plane with the first connection 322 and strands of the first cable 320 associated with the data plane with the second connection 324. In other embodiments, the multiplexer/demultiplexer can have a multiplexing system configured to differentiate control signals and data signals received within a strand and forward the signals appropriately. After separating the data signals and the control signals received from the access switch 311, the multiplexer/demultiplexer 366 sends the data signals to the data stage module 364 of the interface card 360 via the second connection 324 and the control signals to the control switch 362 via the first connection 322. Similarly, after combining data signals and control signals received from the data stage module 364 and the control switch 362, respectively, the signals can be sent to the access switch 311 via the first cable 320.

In other embodiments, the interface card does not include a multiplexer/demultiplexer. In such embodiments, each strand of the first cable is a dedicated data strand (only data signals are carried on the strand) or a dedicated control strand (only control signals are carried on the strand). In some embodiments, for example, each cable has 24 strands where 22 are dedicated data strands and 2 are dedicated control strands. Each dedicated data strand is operatively coupled to the second connection and each dedicated control strand is operatively coupled to first connection. In such embodiments, if each first cable has 22 dedicated data strands, the second connection can include 22 electrical traces. Similarly, if each first cable has 2 control strands, each first connection can include 2 electrical traces. In this manner, a multiplexer/demultiplexer is not needed as each strand of the first cable is operatively coupled to a different electrical trace on the interface card. In embodiments where the first cable is an optical cable, a multi-channel parallel optical transceiver can be used at each end of the first cable to send and receive the optical signals.

The data stage module 364 is within the data plane of the switch fabric and is configured to route data through the switch fabric. For example, the data stage module 364 can be a module within a stage of a switch fabric. In some embodiments, for example, the data stage module 364 can be associated with a first stage and a final stage of a switch fabric. In such embodiments, the data stage module 364 can send data signals to a module associated with the second stage of the switch fabric (not shown in FIG. 3) and receive data signals from a module associated with the next to last stage (not shown in FIG. 3) of the switch fabric via connections not shown in FIG. 3. The module associated with the second stage of the switch fabric and the module associated with the next to last stage of the switch fabric can be disposed within the second chassis 350 and/or a separate chassis (not shown).

The data stage module 364 can be any module configured to route the data through the switch fabric. For example, the data stage module 364 can be a cell switch, a crossbar switch, and/or the like. The remaining portions of the data plane (e.g., the modules associated with the other stages of the switch fabric) are not shown in FIG. 3 but can be similar to the switch fabric portions 130, 140 shown and described above in relation to FIG. 1.

The control switch 362 of the interface card 360 is within the control plane 300 of the switch fabric and is configured to route control signals between a control card 370 and the interface card 360. Accordingly, the control switch 362 can be any switch configured to route control signals. In some embodiments, for example, the control switch 362 of the interface card 360 can be a cell switch, a crossbar switch, and/or the like.

The control switch 362 on the interface card 360 allows the interface card 360 to be operatively coupled to multiple control cards 370. Thus, the switch 362 can determine which control card 370 to send control signals to and/or which control card 370 to receive control signals from. In some embodiments, for example, the second chassis 350 includes two control cards 370. In such embodiments, the control switch 362 of the interface card 360 can be operatively coupled to the two control cards 370 though the control switch 362.

Because the control switch 362 is disposed on the same interface card 360 as the data stage module 364, a portion of the control plane of the system is disposed on the same interface card 360 as a portion of the data plane of the system. Accordingly, when the interface card 360 is inoperable and/or removed from the system, both the data plane and the control plane are inoperable with respect to the interface card 360. Thus, data signals are not transferred through data stage module 364 without the control plane controlling and monitoring the data signals.

The control card 370 includes a control switch 372, a control processor 374 and a connection 376 that operatively couples the control switch 372 with the control processor 374. The connection 376 can be constructed of any material capable of operatively coupling the control switch 372 with the control processor 374. Similar to the first connection 322 of the interface card 360, in some embodiments, the connection 376 is an electrical trace on a printed circuit board (PCB). In other embodiments, the connection can be an optical fiber, a copper wire and/or the like. The connection 376 is configured to carry data signals between the control processor 374 of the control card 370 and the control switch 372 of the control card 370.

Similar to the control switch 362 of the interface card 360, the control switch 372 of the control card 370 can be any switch configured to route control signals. In some embodiments, for example, the control switch 372 of the control card 370 can be a cell switch, a crossbar switch, and/or the like.

The control switch 372 can be configured to operatively couple the control card 370 to multiple interface cards 360 and/or multiple control plane processor cards 381. In some embodiments, for example, eight interface cards 360 are disposed within the second chassis 350. In such embodiments, the control switch 372 can operatively couple the control card 370 to each of the eight interface cards 360. The control switch 372 can be configured to determine to which interface card 360 to send a particular control signal and/or to determine from which interface card 360 to receive a particular control signal. Similarly, in some embodiments, two control plane processor cards 381 are disposed within the third chassis 380. In such embodiments, the control switch 372 can operatively couple the control card 370 to each of the two control plane processor cards 381.

The control processor 374 of the control card 370 is configured to control the operation of the control switch 372. Accordingly, the control processor 374 is configured to send control signals to and receive control signals from the control switch 372 via a connection 376. The connection 376 can be constructed of any material configured to carry a control signal. In some embodiments, for example, the connection 376 is an electrical trace. In other embodiments, for example, the connection can be an optical fiber, a copper wire and/or the like.

The control signals sent by the control processor 374 to the control switch 372 are configured to control to which interface card 360 the control card 370 is sending control signals and/or from which interface card 360 the control card 370 is receiving control signals. Additionally, the control signals sent by the control processor 374 to the control switch 372 are configured to determine which control plane processor card 381 the control card 370 is sending control signals to and/or receiving control signals from, as described in further detail herein.

A control plane processor card 381 having a control plane processor switch 382, a control plane processor 384, and a connection 386 is disposed within the third chassis 380. The control plane processor 384 is operatively coupled to the control plane processor switch 382 by the connection 386. The connection 386 can be constructed of any material configured to carry a control signal. In some embodiments, for example, the connection 386 is an electrical trace. In other embodiments, for example, the connection can be an optical fiber, a copper wire and/or the like.

The control plane processor 384 is configured to control and/or monitor the operation of the switch fabric. In some embodiments, for example, the control plane processor 384 can perform functions that control the routing of the data signals through the data plane of the switch fabric. In some embodiments, for example, the control plane processor 384 can execute data-plane-topology protocols, execute control-plane-topology protocols, control error recovery, define routing tables, define switch tables, send a routing table and/or a switch table to the other components of the control plane (e.g., a control card 370 or a local control processor 314 of an access switch 311), and/or the like.

Similar to the control switch 362 of the interface card 360 and the control switch 372 of the control card 370, the control plane processor switch 382 can be any switch configured to route control signals. In some embodiments, for example, the control switch 372 of the control card 370 can be a cell switch, a crossbar switch, and/or the like.

The control plane processor switch 382 is configured to forward the control signals sent from the control plane processor 384 to the destination control card 370. In some embodiments, for example, the control plane processor switch 382 is operatively coupled to multiple control cards 370 by multiple second cables 330. In such embodiments, the control plane processor switch 382 can ensure that the control signals generated by the control plane processor 384 are sent to the destination control cards 370, as described in further detail below.

In use, the control plane processor 384 can execute a control-plane-topology protocol. The control-plane-topology protocol is used to determine the locations of the components within the control plane of the switch fabric system. In some embodiments, for example, the control plane processor 384 sends a discovery signal to each control card 370 within the switch fabric system. The control cards 370 then send discovery signals to each interface card 360 within the switch fabric system. The interface cards 360 then send discovery signals to each access switch 311 within the switch fabric system. Each access switch 311, interface card 360, and control card 370 can send a reply containing its location within the switch fabric system to the control plane processor 384. In this manner, the control plane processor 384 can define a routing table that includes the location of each access switch 311, interface card 360, control card 370 and/or other components within the switch fabric system. After defining a routing table, the control plane processor 384 can distribute a copy of the routing table to each control card 370 within the switch fabric system. In other embodiments, the control plane processor 384 also distributes a copy of the routing table to each interface card 360 and/or to each access switch 311.

Each control card 370 within the switch fabric system can use the routing table to control the routing of data through the switch fabric. Based on the routing table, the control processor 374 can determine to which module within the next stage of a switch fabric a module within a stage of the switch fabric should send the data. In some embodiments, the switch fabric system includes multiple control cards 370. In such embodiments, each control card 370 can include a control processor 374 that controls the routing for a given number of interface cards 360.

If any portion of the switch fabric system fails to operate correctly and/or is removed from operation, the control plane processor 384 receives a notification and updates the routing table accordingly. For example, if cable 320 is disconnected, the control processor 374 sends a notification signal to the control plane processor 384. Based on the notification signal, the control plane processor 384 can remove the reference(s) to the access switch 311 from the routing table. Similarly, if a component is added to the switch fabric system, the control plane processor 384 can receive a notification signal and add a reference(s) to the component to the routing table. For example, if an access switch 311 is added to the switch fabric system, the control plane processor 384 receives a notification signal, updates the routing table accordingly, and sends a copy of the updated routing table to the control plane processors 374.

Figure 4:
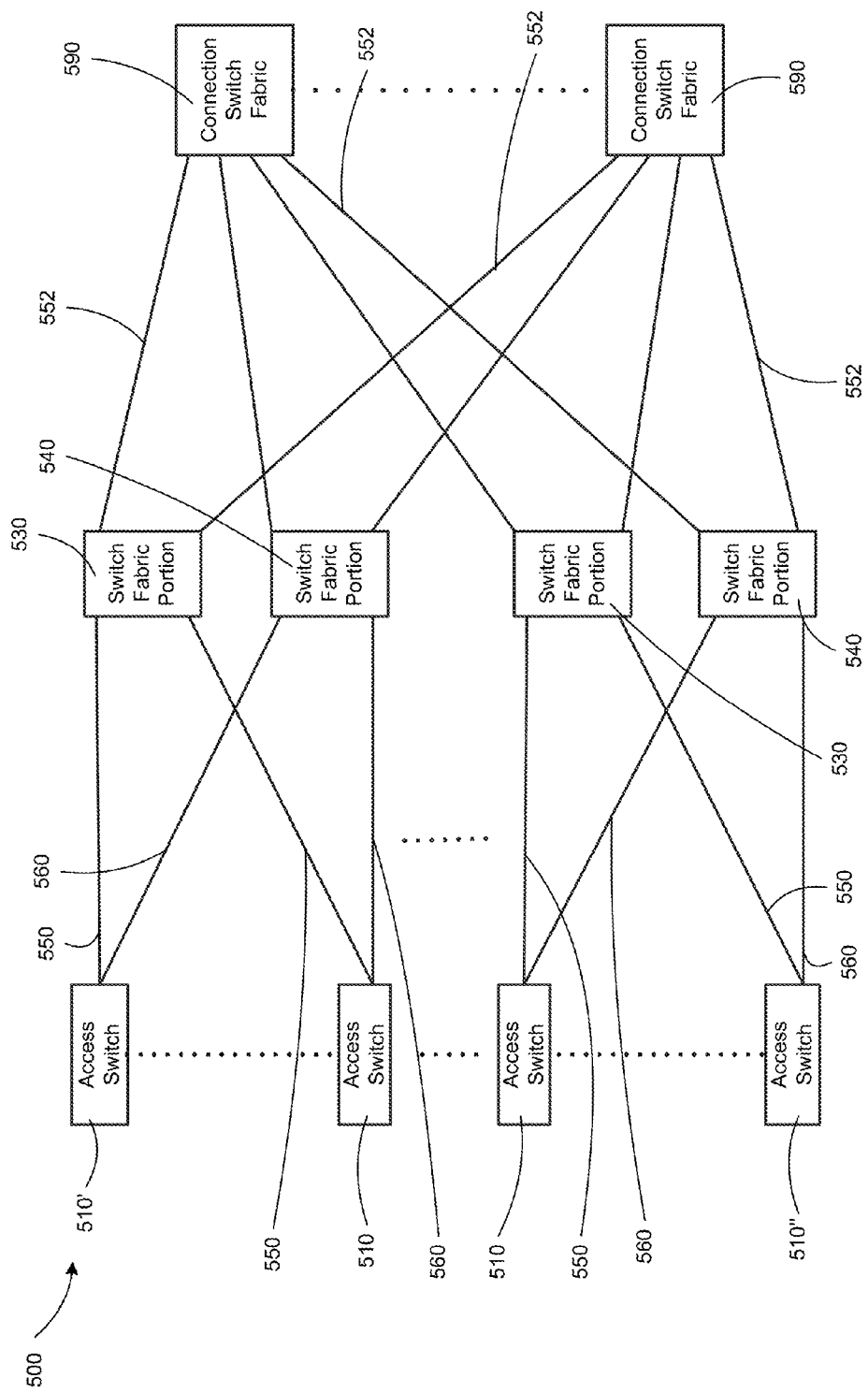
FIG. 4 is a schematic illustration of a portion of a data plane of a switch fabric system, according to another embodiment.
Figure 5:
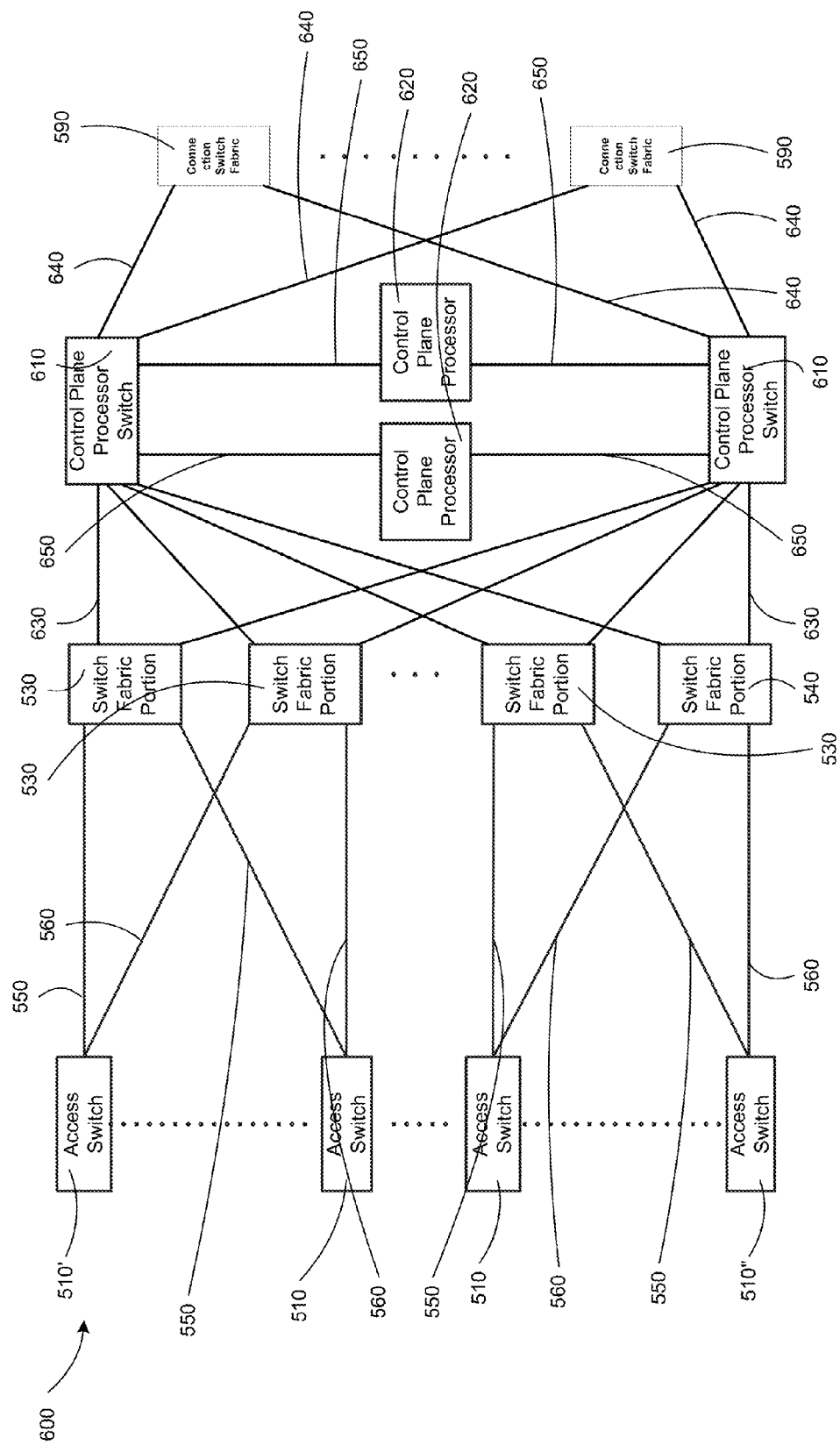
FIG. 5 is a schematic illustration of a portion of a control plane of the switch fabric system shown in FIG. 4.

FIGS. 4 and 5 show a portion of a data plane 500 of a switch fabric system and a portion of a control plane 600 of the switch fabric system, respectively, according to another embodiment. The data plane 500 of the switch fabric system includes multiple access switches 510, multiple first switch fabric portions 530, multiple second switch fabric portions 540, a first set of cables 550, a second set of cables 560, multiple connection switch fabrics 590, and a third set of cables 552. In some embodiments, the data plane 500 of the switch fabric system can be structurally and functionally similar to the switch fabrics shown and described in U.S. patent application Ser. No. 12/345,500, filed Dec. 29, 2008, entitled "System Architecture for a Scalable and Distributed Multi-Stage Switch Fabric," and U.S. patent application Ser. No. 12/345,502, filed Dec. 29, 2008, entitled "Methods and Apparatus related to a Modular Switch Architecture," both of which have been incorporated herein by reference in their entireties.

The access switches 510, the first set of cables 550 and the second set of cables 560 of the switch fabric system are structurally and functionally similar to the access switches 110, the first set of cables 150, and the second set of cables 160, respectively, described in connection with FIG. 1. Accordingly, the access switches 510 are configured to send signals to and receive signals from the first switch fabric portion 530 and the second switch fabric portion 540.

Each switch fabric portion 530, 540 is operatively coupled to each connection switch fabric 590 via the third set of cables 552. Thus, each switch fabric portion 530, 540 is operatively coupled to the other switch fabric portions 530, 540 via the connection switch fabrics 590. In some embodiments, the data plane 500 includes a five-stage switch fabric with the first stage and fifth stage of the switch fabric in the switch fabric portions 530, 540 and the second stage, the third stage and the fourth stage of the switch fabric in the connection switch fabrics 590.

The connection switch fabrics 590 can be structurally similar to the switch fabric portions 130, 140 described above. In some embodiments, for example, each connection switch fabric 590 includes multiple cell switches and/or crossbar switches configured to route data between switch fabric portions 530, 540.

In some embodiments, each cable of the third set of cables 552 includes multiple strands. The strands of each cable of the third set of cables 552 can be constructed of any material suitable to transfer data between the switch fabric portions 530, 540 and the connection switch fabrics 590. In some embodiments, for example, each cable 552 is constructed of multiple optical fibers configured to carry an optical signal. In other embodiments, the strands are electrical conductors, such as copper, configured to carry an electrical signal.

In some embodiments, each cable 552 can have thirty-six transmit and thirty-six receive strands. The thirty-six transmit strands of each cable 552 can include thirty-two strands for transmitting data, and four strands for expanding the data capacity and/or for redundancy. Similarly, the thirty-six receive strands of each cable 552 have thirty-two strands for transmitting data, and four strands for expanding the data capacity and/or for redundancy. In other embodiments, any number of strands can be contained within each cable.

As shown in FIG. 5, the control plane 600 of the switch fabric system includes the access switches 510, the switch fabric portions 530, 540, the first set of cables 150, the second set of cables 160, the connection switch fabrics 590, control plane processors 620, control plane processor switches 610, a fourth set of cables 630, a fifth set of cables 640, and a sixth set of cables 650. Each control plane processor 620 and each control plane processor switch 610 can be structurally and functionally similar to the control plane processor 384 and the control plane processor switch 382, respectively, discussed in connection with FIG. 3. As such, each control plane processor switch 610 is configured to forward control signals sent from a control plane processor 620 to another portion of the switch fabric system.

Multiple control plane processors 620 can each control a set of access switches and/or perform a different function. In some embodiments, a first control plane processor 620 is configured to control the routing of data originating from a first set of access switches configured to send data to a given switch fabric portion 530, 540, and a second control plane processor 620 is configured to control the routing of data originating from a second set of access switches configured to send data to another switch fabric portion 530, 540. In such embodiments, each control plane processor 620 controls a set of access switches based on their physical location in the switch fabric system.

In other embodiments, each control plane processor does not have information on the physical location of the access switches it controls. In such embodiments, a first control plane processor is configured to control the routing of data originating from a group of access switches from a first set of access switches to a given switch fabric portion, and the routing of data originating from a group of access switches from a second set of access switches to another switch fabric portion. A second control plane processor is configured to control the routing of data originating from the other access switches from the first set of access switches and the routing of data originating from the other access switches from the second set of access switches. If the physical location of an access switch changes, the same control plane processor can control the routing of data from that access switch. In this manner, each control plane processor can control the same access switches regardless of the physical location of the access switches.

In still other embodiments, each control plane processor can control each access switch for a separate purpose. In some embodiments, for example, a first control plane processor can be used to run topology protocols, and a second control plane processor can be used to distribute the routing tables to modules within the control plane of the switch fabric system. In other embodiments, a first control plane processor can be used to perform routing functions, and a second control plane processor can be used to handle error detection and recovery. In yet other embodiments, any control plane function can be performed by a first control plane processor and another control plane function can be performed by a second control plane processor.

In yet other embodiments, each control plane processor controls the routing of data based on the data itself. In some embodiments, for example, specific data stored on a server (or storage device) operatively coupled to an access switch (e.g., data pertaining to a certain company) can be controlled by a specific control plane processor regardless of the server on which it is stored and/or regardless to which access switch the server is operatively coupled. In such embodiments, if the data is moved between servers (or storage devices) within the system (e.g., to optimize the performance and/or or capacity of the system) the same control plane processor can control the data. Thus, the control plane processor controls the data regardless of which access switch the server containing the data is operatively coupled to and regardless of the server on which the data is stored.

Each control plane processor 620 is operatively coupled to control plane processor switches 610 by cables from the sixth set of cables 650. Each cable from the sixth set of cables 650 can be any cable capable of operatively coupling the control plane processor 620 with the control plane processor switch 610. In some embodiments, for example, each cable from the sixth set of cables 650 can be a 10 Gigabit Ethernet line. In other embodiments, each cable from the sixth set of cables 650 can be a 1 Gigabit Ethernet line. In still other embodiments, each cable from the sixth set of cables can be any Ethernet line or any other communication connection according to a suitable protocol.

In some embodiments, each cable from the sixth set of cables 650 includes multiple strands. The strands of each cable from the sixth set of cables 650 can be constructed of any material configured to carry a signal. In some embodiments, for example, the strands are optical fibers configured to carry an optical signal. In other embodiments, the strands are electrical conductors, such as copper, configured to carry an electrical signal. In some embodiments, each cable from the sixth set of cables 650 can include a single strand configured to carry a signal.

In other embodiments, each control plane processor can be operatively coupled to a control plane processor switch by another means, such as, for example, an electrical trace on a printed circuit board (PCB). In such embodiments, the control plane processor switch and the control plane processor can be within a single chip package, similar to the control plane processor switch 384 and the control plane processor switch 382, described above.

Each switch fabric portion 530, 540 is operatively coupled to each control plane processor switch 610 by a cable from the fourth set of cables 630. Each cable from the fourth set of cables 630 can be structurally similar to each cable from the sixth set of cables 650. Each cable from the fourth set of cables 630 is configured to send control signals to and receive control signals from the control plane processor switches 610.

Each connection switch fabric 590 is operatively coupled to each control plane processor switch 610 by a cable from the fifth set of cables 640. Each cable from the fifth set of cables 640 can be structurally similar to each cable from the sixth set of cables 650. Each cable from the fifth set of cables 640 is configured to send control signals to and receive control signals from the control plane processor switches 610.

In use, the control plane processors 620 can run a control-plane-topology protocol. The control-plane-topology protocol is used to determine the location of the components within the control plane of the switch fabric system. In some embodiments, for example, the control plane processors 620 send a discovery signal to a control card (not shown) co-located with each switch fabric portion 530, 540 and to a control card (not shown) co-located with each connection switch fabric 590. The control cards co-located with each switch fabric portion 530, 540 then send discovery signals to interface cards (not shown) associated with each switch fabric portion 530, 540. The interface cards then send discovery signals to each access switch 510 within the switch fabric system. Each access switch 510, interface card, control card associated with each switch fabric portion 530, 540 and control card associated with each connection switch fabric 590 can send a reply signal indicating its location within the switch fabric system to the control plane processors 620. Based on these reply signals, the control plane processors 620 can define a routing table that includes the location of each access switch 510, interface card, control card and/or other components within the switch fabric system. The control plane processors 620 can then distribute a copy of the routing table to each control card associated with each switch fabric portion 530, 540 and each control card associated with each connection switch fabric 590. In other embodiments, the control plane processors 620 also distribute the routing table to each interface card and/or to each access switch 510.

Each control card associated with the switch fabric portions 530, 540 and associated with the connection switch fabrics 590 can then control routing of data through the switch fabric. Based on the routing table, the control cards can determine to which module within the next stage of a switch fabric a module within a stage of the switch fabric should send the data. In some embodiments, each control card can control the routing for a given number of stages within the switch fabric.

Once the routing information is determined, data packets can be sent from a first access switch 510 to a second access switch 510 through the data plane 500 of the switch fabric system. For example, access switch 510' can send a data packet to access switch 510" through the data plane 500. The routing table can be used to determine to which switch fabric portion 530, 540 the access switch 510' should send the data packet. Once the data reaches the destination switch fabric portion 530, 540, the routing table can be used to determine to which connection switch fabric 590 the switch fabric portion 530, 540 should send the data packet. Once the data packet reaches the connection switch fabric, the routing table can be used to determine to which switch fabric portion 530, 540 and subsequently, to which access switch 510", the data packet should be sent. In this manner, the data packet is sent from the access switch 510' to the access switch 510".

In other embodiments, the first access switch sends a portion of the data to each switch fabric portion to which it is operatively coupled. In such embodiments, the routing information is not needed to send the data from the access switch to the switch fabric portion because every switch fabric portion coupled to the first access switch receives a portion of the data. Then, each switch fabric portion sends a portion of the data (e.g., cells) received by the switch fabric portion to each connection switch fabric. In such embodiments, the routing information is not needed to send the data from the switch fabric portions to the connection switch fabrics because every connection switch fabric receives a portion of the data. The routing data is then used to determine to which set of switch fabric portions the connection switch fabrics should send portions of the data packet. In such embodiments, the switch fabric portions then use the routing data to determine to which access switch (e.g., the second access switch) the portions of the data packet (e.g., cells) should be sent. In such embodiments, the second access switch then reassembles the data packet from the portions of the data packet (e.g., cells) received from each switch fabric portion.

If any portion of the switch fabric system fails to operate correctly and/or is removed from operation, a control plane processor 620 receives a notification and updates the routing table accordingly. For example, if a cable 550 is disconnected, the switch fabric portion 530, 540 sends a notification signal to the control plane processor 610. Based on the notification signal, the control plane processor 610 can remove the reference(s) to access switch 510 from the routing table. Similarly, if a component is added to the switch fabric system, a control plane processor 620 can receive a notification signal and add a reference(s) to the component to the routing table. For example, if an access switch 510 is added to the switch fabric system, the control plane processor 620 receives a notification signal, updates the routing table accordingly, and sends a copy of the updated routing table to the control processors associated with each switch fabric portion 530, 540. In other embodiments, the control plane processor can reroute data packets already within the data plane of the switch fabric when a data path fails to operate correctly. In this manner, the data packet can reach its destination via alternative paths.

Figure 6:
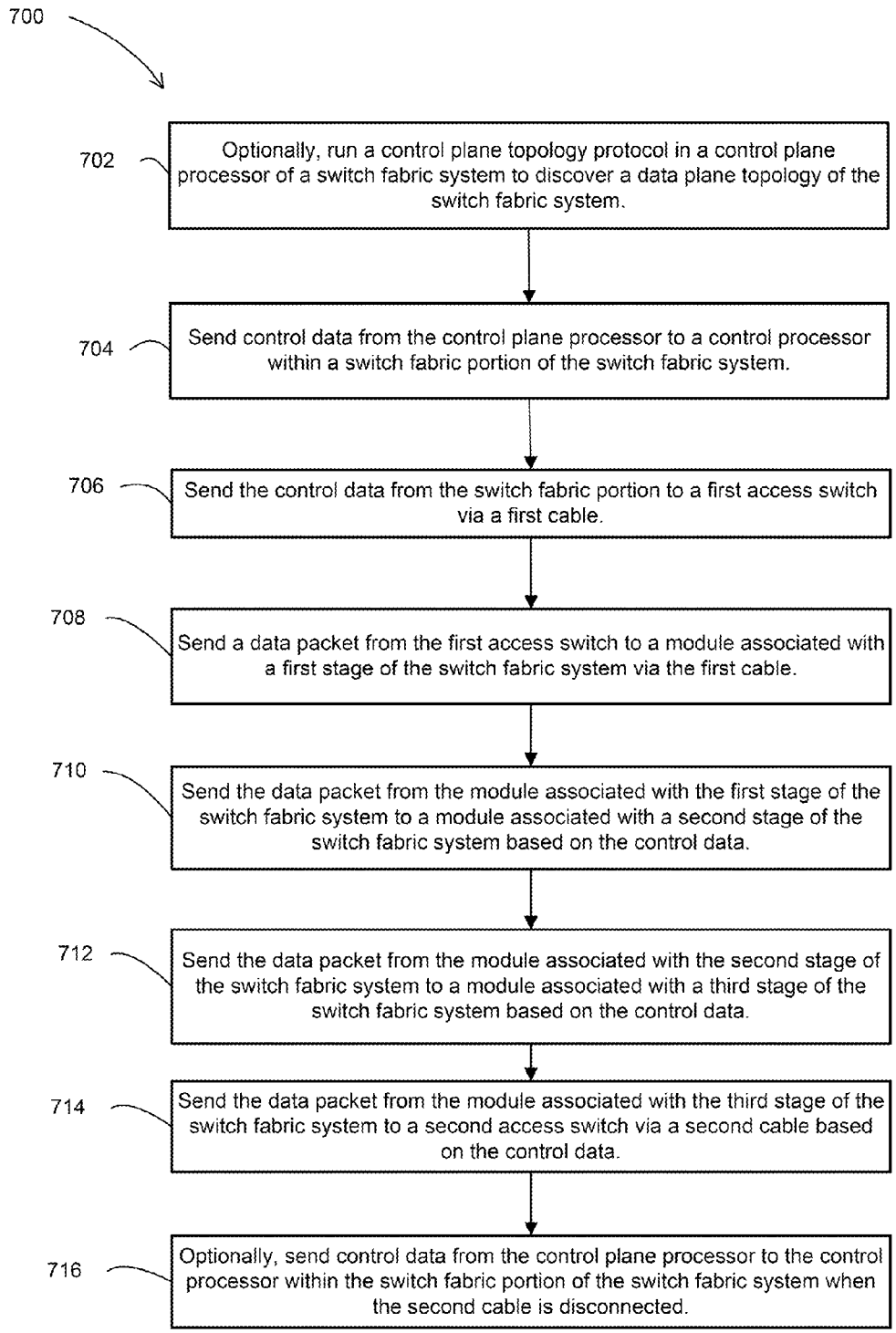
FIG. 6 is a flow chart illustrating a method of sending a data packet from a first access switch to a second access switch, according to another embodiment.

FIG. 6 is a flow chart illustrating a method of sending a data packet from a first access switch to a second access switch, according to another embodiment. The method 700 includes optionally running a control-plane-topology protocol in a control plane processor of a switch fabric system to discover a data plane topology of the switch fabric system, at 702. The control plane processor can be structurally and functionally similar to the control plane processors described herein. Control data is then sent from the control plane processor to a control processor within a switch fabric portion of the switch fabric system, at 704. The control data can be sent from the control plane processor to the control processor via a cable, an electronic trace on a printed circuit board (PCB), a switch, and/or the like.

The control data is then sent from the switch fabric portion to a first access switch via a first cable, at 706. The first cable can be similar to the cables described herein. A data packet is then sent from the first access switch to a module associated with a first stage of the switch fabric system via the first cable, at 708. The data packet is then sent from the module associated with the first stage of the switch fabric system to a module associated with a second stage of the switch fabric system based on the control data, at 710. The data packet is then sent from the module associated with the second stage of the switch fabric system to a module associated with a third stage of the switch fabric system based on the control data, at 712. In some embodiments, the module associated with the first stage, the module associated with the second stage, and/or the module associated with the third stage are disposed within a single chassis. In other embodiments, the module associated with the first stage, the module associated with the second stage, and/or the module associated with the third stage are disposed within different chassis. In other embodiments, the data packet is also sent to a module associated with a fourth stage and a module associated with a fifth stage.

The data packet is then sent from the module associated with the third stage of the switch fabric system to a second access switch via a second cable based on the control data, at 714. The second access switch and the second cable can be structurally and functionally similar to the first access switch and the first cable. In some embodiments, control data is optionally sent from the control plane processor to the control processor within the switch fabric portion of the switch fabric system when the second cable is disconnected, at 716. This allows the control plane processor to update the routing table accordingly.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, for example, the various components of the system can include optical sources and receivers. For example, if data is transferred between the access switch and the interface card via a cable having optical fibers, the access switch and the interface card can have an optical source, such as a vertical-cavity surface-emitting laser (VCSEL), that can convert an electrical signal used on the sending chip (e.g., the access switch or the interface card) into an optical signal to be sent via the cable to the receiving chip. Similarly, the access switch and the interface card can have an optical receiver configured to receive an optical signal and convert the optical signal into an electrical signal to be used on the receiving chip. In other embodiments, other components of the system, such as, for example, the control card and/or the control plane processor card, also include an optical source and/or an optical receiver.

While shown and described above as having one or two control plane processors, a switch fabric system can have any number of control plane processors according to the size of the workload of the system. For example, a switch fabric system with a respectively small workload (e.g., a small number of access switches and/or stages within the switch fabric) might have a single control plane processor while a system with a larger workload (e.g., a large number of access switches and/or stages within the switch fabric) might have multiple control plane processors. Additionally, if the workload of a system increases and/or decreases, the number of control plane processors in the switch fabric system can be increased and/or decreased, respectively.

In some embodiments, each control card can include multiple processors. In some embodiments, the multiple processors can be used to control various functions performed by the control card. For example, a first processor can control the routing of data and a second processor can control sending signals to a control plane processor to update the routing table. In other embodiments, the first control plane processor can control routing of data originating from a first set of access switches and the second control plane processor can control routing of data originating from a second set of access switches.

In some embodiments, the access switches, the interface cards, the control cards and/or the control plane processor cards can be disposed within the same housing. In some embodiments, the components within the access switches, the interface cards, the control cards, and/or the control plane processor cards can be disposed within a single chip package. In such embodiments, cables are unnecessary.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language. A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; read-only memory ("ROM"); and random-access memory ("RAM") devices such as solid state or FLASH drives. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process for provisioning a host device or network device can be useful in other embodiments and/or processes. Additionally, embodiments described with reference to specific forms of communication such as communication between host device, network devices, network management modules, and external management entities via a network are also applicable to other forms of communication such as communication via a command or control plane. Some embodiments that have been described in relation to a software implementation can be implemented as digital or analog hardware. For example, software modules can be implemented on semiconductor chips. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. An apparatus, comprising:
a switch fabric portion of a switch fabric, the switch fabric portion configured to be coupled to each access switch from a plurality of access switches via a cable from a plurality of cables and having both a data plane portion and a control plane portion physically distinct from the data plane portion,
the switch fabric portion including a control module configured to receive control data from an access switch from the plurality of access switches via the control plane portion of the cable between the access switch and the switch fabric portion,
the control module configured to send the control data to a control plane processor, the switch fabric portion configured to send, based on the control data, a data unit to the access switch via the data plane portion of the cable between the access switch and the switch fabric portion.

2. The apparatus of claim 1, wherein the switch fabric portion is disposed within a chassis different from (1) a chassis in which the access switch from the plurality of access switches is disposed and (2) a chassis in which the control plane processor is disposed.

3. The apparatus of claim 1, wherein the data plane portion of the cable includes a first optical fiber and the control plane portion of the cable includes a second optical fiber different than the first optical fiber.

4. The apparatus of claim 1, wherein the control module is included on a control card configured to store the control data.

5. The apparatus of claim 1, wherein the control data includes at least a portion of a routing table, the switch fabric portion configured to send the data unit to the access switch based on the portion of the routing table.

6. The apparatus of claim 1, wherein the control module is configured to send the control data to the control plane processor such that the control plane processor defines a representation of a topology of the switch fabric and the plurality of access switches based at least in part on the control data.

7. The apparatus of claim 1, wherein the access switch is a first access switch from the plurality of access switches, the control module is configured to receive control data from a second access switch from the plurality of access switches via the control plane portion of the cable between the second access switch and the switch fabric portion.

8. The apparatus of claim 1, wherein the access switch is a first access switch from the plurality of access switches, the control module is configured to receive control data from a second access switch from the plurality of access switches via the control plane portion of the cable between the second access switch and the switch fabric portion,
the control module configured to send the control data from the second access switch to the control plane processor,
the switch fabric portion configured to send a data unit to the second access switch (1) via the data plane portion of the cable between the second access switch and the switch fabric portion and (2) based on the control data from the second access switch.

9. A method, comprising:
sending control data within a control plane of a switch fabric system from a control plane processor to a control module within a switch fabric portion of the switch fabric system such that the control module sends the control data within the control plane to an access switch via a control plane portion of a cable also including a data plane portion;
receiving, at the control plane processor, control data from the access switch via the control plane portion of the cable;
identifying, at the control plane processor, a data plane topology of the switch fabric system based at least in part on receiving the control data via the control plane portion of the cable and such that a data packet is sent within the data plane portion of the cable from the access switch to the switch fabric portion, the data plane portion being physically distinct from the control plane portion.

10. The method of claim 9, wherein the control data received from the access switch includes routing information.

11. The method of claim 9, wherein the receiving includes receiving the control data via the control module and the control plane portion of the cable.

12. The method of claim 9, wherein the data plane portion of the cable includes a first optical fiber and the control plane portion of the cable includes a second optical fiber different than the first optical fiber.

13. The method of claim 9, wherein the control plane processor is disposed within a chassis different from (1) a chassis in which the access switch is disposed and (2) a chassis in which the switch fabric portion is disposed.

14. The method of claim 9, wherein the access switch is a first access switch, the method further comprising:
receiving, at the control plane processor, control data from a second access switch,
the identifying the data plane topology of the switch fabric system being based at least in part on receiving the control data from the second access switch.

15. An apparatus, comprising:
a control plane processor configured to send control data within a control plane of a switch fabric system to a control module within a switch fabric portion of the switch fabric system such that the control module sends the control data within the control plane to an access switch via a control plane portion of a cable also including a data plane portion,
the control plane processor configured to receive control data from the access switch via the control plane portion of the cable,
the control plane processor configured to identify a data plane topology of the switch fabric system based at least in part on receiving the control data via the control plane portion of the cable and such that a data packet is sent within the data plane portion of the cable from the access switch to the switch fabric portion, the data plane portion being physically distinct from the control plane portion.

16. The apparatus of claim 15, wherein the control plane processor is configured to receive the control data via the control module and the control plane portion of the cable.

17. The apparatus of claim 15, wherein the control data received from the access switch includes routing information.

18. The apparatus of claim 15, wherein the data plane portion of the cable includes a first optical fiber and the control plane portion of the cable includes a second optical fiber different than the first optical fiber.

19. The apparatus of claim 15, wherein the control plane processor is disposed within a chassis different from (1) a chassis in which the access switch is disposed and (2) a chassis in which the switch fabric portion is disposed.

20. The method of claim 15, wherein the access switch is a first access switch, the control plane processor is configured to receive control data from a second access switch, the control plane processor configured to identify the data plane topology of the switch fabric system based at least in part on receiving the control data from the second access switch.

* * * * *